US005229979A

United States Patent [19]

Scheinbeim et al.

[11] Patent Number: 5,229,979

[45] Date of Patent: Jul. 20, 1993

[54] ELECTROSTRICTIVE DRIVING DEVICE, PROCESS FOR SONIC WAVE PROJECTION AND POLYMER MATERIALS FOR USE THEREIN

[75] Inventors: Jerry I. Scheinbeim, Somerset; Brian A. Newman, Highland Park, both of N.J.

[73] Assignee: Rutgers, The State University of New Jersey, New Brunswick, N.J.

[21] Appl. No.: 804,705

[22] Filed: Dec. 13, 1991

Related U.S. Application Data

[63] Continuation-in-part of Ser. No. 627,260, Dec. 14, 1990, abandoned.

[51] Int. Cl.[5] .......................... H04B 17/00

[52] U.S. Cl. .......................... 367/157; 367/163; 367/140; 310/311; 310/334; 310/800; 29/25.35

[58] Field of Search .......................... 310/800, 311, 334; 367/157, 163, 140; 29/25.35

[56] References Cited

U.S. PATENT DOCUMENTS

| | | | |
|---|---|---|---|
| 3,801,839 | 4/1974 | Yo | 310/8 |
| 4,257,686 | 3/1981 | Albertinetti et al. | 350/360 |
| 4,933,479 | 6/1990 | Kotaka et al. | 558/199 |

*Primary Examiner*—J. Woodrow Eldred
*Attorney, Agent, or Firm*—Leroy G. Sinn

[57] ABSTRACT

The provided invention is a novel electrostrictive driving device which comprises a sonic wave projector element having alternating electrodes and polymer material film layers. The device provides when subjected to a high bias voltage and a superimposed A.C. voltage, a high Angstroms/Volt response. Also, provided is a process for projecting sonic waves using the electrostrictive driving device of this invention.

30 Claims, 2 Drawing Sheets

ELECTROSTRICTIVE DRIVING DEVICE, PROCESS FOR SONIC WAVE PROJECTION AND POLYMER MATERIALS FOR USE THEREIN

CROSS-REFERENCE TO RELATED APPLICATIONS

This application is a continuation-in-part of U.S. application 07/627,260 filed Dec. 14, 1990, now abandoned.

TECHNICAL FIELD

This invention relates to an electrostrictive driving device utilizing an element comprising a film layer or layers of a polymeric material. The film of the element in operation has a high bias voltage to which is applied an alternating voltage whereby is generated a highly effective sonic wave projection. Also, provided is a process for sonic wave generation using the device.

BACKGROUND ART

Piezoelectric driving devices for sonic wave generation are generally known. Such devices are utilized for various purposes such as components of speakers of high fidelity sound systems, as devices used to generate acoustic signals for detection of objects in a defined path, such as detection of objects underwater, for example, objects such as submarines, ships and the like.

In such devices, a common piezoelectric material for use in making the element for sonic wave generation is a ceramic, referred to as a PZT material or a P (lead) Z (zirconium) T (titanium) alloy or material. One used is referred to as PZT4.

It would be economically preferable to utilize a polymeric piezoelectric material for this use. Efficiencies of making the element and other advantages would be realized using such polymeric material provided such materials would effectively provide high and useful piezoelectric driving or sonic wave projection, as desired.

Piezoelectric polymeric materials with sufficient high driving amplitudes are not known at the present. The invention proposed uses an electrostrictive polymeric material which can be made to provide sufficient driving amplitudes.

SUMMARY OF INVENTION

Provided by this invention are sonic wave generation elements of an electrostrictive driving device using polymeric material. The material is required to have a low modulus of about $10^7$ to about $10^8$ N/m$^2$, an apparent piezoelectric response with a sensitivity greater than about 1 Angstrom/V. A variety of polymeric materials can be used for this purpose. A suitable polymeric material for use is a poly(vinylidene fluoride) ($PVF_2$) which is in solution. A suitable solvent for $PVF_2$ has been found to be tricresyl phosphate (TCP). The solvent may be varied greatly depending upon the polymeric material used and other factors. Also, the polymeric material can also be greatly varied. Combinations of polymeric materials can be used in making the element. Also, polymeric materials can be used wherein no or low amounts of solvents are used. The variations can be used so long as the desired element can be made using films of the polymeric materials.

The film of the sonic wave projecting element is subjected to a high bias voltage wherein $E^2$ is proportional to thickness strain. It is desired that the element generates at least about 3 Angstroms/volt, preferably at least about 5 Angstroms ($10^{-10}$ m, rms) per volt. It is desired that the polymeric material modulus, N/m$^2$, be from about $10^7$ to about $10^8$ N/m$^2$ and have a sensitivity of at least about 6 Angstroms/V.

The polymeric material present in the element as a film is electrostrictive.

In the process of sonic wave projection or generation using the electrostrictive driving device of this invention, a bias voltage is applied of about 300 to about 1000, suitably about 500. A greater or lesser bias voltage might be selected in selected circumstances.

DETAILED DESCRIPTION OF THE INVENTION AND THE PREFERRED EMBODIMENTS

Figure 1:
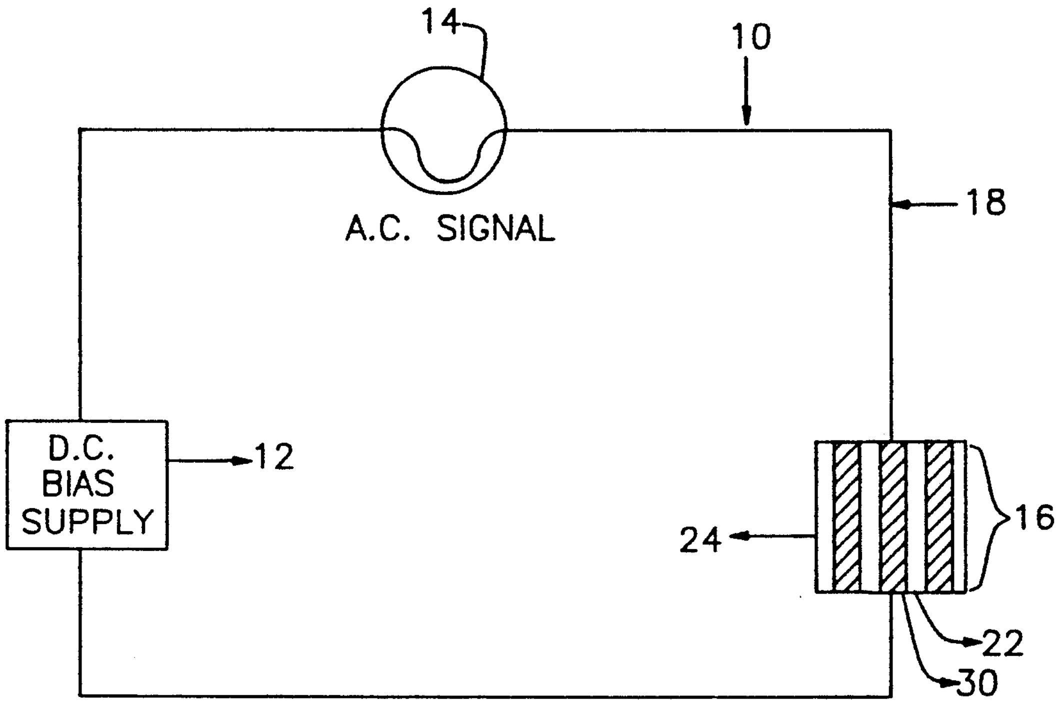
FIG. 1 is a schematic representation of an electrostrictive driving device of this invention.

The process can be carried out by first dissolving the polymeric material to be used in the required amount of a suitable solvent or solvents to form a solution. For example, if poly(vinylidene fluoride) is selected as the material, a suitable solvent such as tricresylphosphate can be used. It has been found that about five parts of a poly(vinylidene fluoride), which is suitable for use in making the sonic wave generation element, is an acceptable amount to dissolve in 95 parts of tricresyl phosphate. Another suitable solvent for making the polymeric material film for the element can be used if desired. The mixture is heated to about 190° C. to aid dissolution. It has been found that a capacitor grade poly(vinylidene fluoride) as sold by Kureha Kagoku Kogko Kabishiki Kaisha is suitable.

The solvent content in the solution is reduced prior to use in making the film for the element. For example, in the case of poly(vinylidene fluoride)/tricresylphosphate solution, the solvent content can be reduced from 95 parts to 50 parts or below such as to 26.5 parts, providing the poly(vinylidene fluoride) remains in solution.

It has been found suitable to reduce the TCP content to about 60 to about 35 percent in the polymeric material based on the weight of the polymeric material.

The solvent is suitably reduced by evaporation as known to those skilled in the art.

Polymeric materials which can be used in this invention can vary widely so long as they have a capability of providing the desired properties of the polymeric material film of the sonic wave generation element of this invention. As mentioned above, a preferred material is poly(vinylidene fluoride). Copolymers of vinylidene fluoride are also desirable materials, such as vinylidene fluoride copolymers with vinyl fluoride, trifluoroethylene, tetrafluoroethylene, vinyl chloride, methylmethacrylate, and others. The vinylidene fluoride content can vary in the range of from about 30 percent to about 95 percent based on the total polymer weight. Other polymers which can be used are polyvinylchloride polyesters such as polymethylacrylate, polymethylmethacrylate, and the like, vinylidene cyanide/vinyl acetate copolymers, vinylidene cyanide/vinyl benzoate copolymers, vinidene cyanide/isobutylene copolymers, vinylidene cyanide/methyl methacrylate copolymers, polyvinylfluoride, polyacrylonitrile, polycarbonate, and nylons such as Nylon-7 and Nylon-11, natural polymers such as cellulose and proteins, synthetic polymers such as derivatives of cellulose, such as esters and ethers, poly-gamma-(-methyl-L-glutamate), certain polymers having a rubbery character such as polyurethane rubbers, silicone rubbers, polyurea rubbers, rubbers having combination of urethane and urea groups or the like.

A variety of suitable solvents can be used depending upon the polymeric material used, cost and safety consideration, equipment used, and other factors. In the use of poly(vinylidene fluoride) material, tricresylphosphate has been found to be a suitable solvent. It is also suitable for use when many copolymers of vinylidene fluoride are used. Dibutyl phthalate can also be used as the solvent for these vinylidene polymers. In the use of nylon-7 and nylon-11, 2-ethyl-1,3-hexanediol can be used. Other solvents can be used depending upon the polymer material used and other factors and will be suggested to those skilled in the art.

The term solution as used herein has its usual meaning of a mixture of two or more elements or compounds which appear to be homogeneous even to the highest possible magnification of visible light. *The Encyclopedia of Chemistry,* 2nd Ed., George L. Clark, Reinhold Publishing Corporation, New York, N.Y., 1966, page 989.

Measurements of dieletric constant and dynamic mechanical modulus, and other measurements, are determined in conventional manner. Sensitivity values, Angstroms/V, of polymeric materials of the films used in making the sonic wave generation elements of the electrostrictive driving devices of this invention can be determined by measuring the change in the thickness of a free standing film by use of an interferometer on each side of the film to measure the displacement of each film surface during the application of the electrostrictive process. Such a measuring system is generally described by W. Y. Pan and L. E. Cross, Rev. Sci. Instrum. 60(8), August 1989. Also, the sensitivity values can be measured using certain optical probes which measure accurately the distances from the probe to the surface of the film during the operation of the process.

A certain amount of crystallinity in the polymeric material, usually a relatively small amount, can be advantageous.

Certan additives or dopants can be incorporated into the polymeric materials of this invention to provide certain additional properties so long as their presence does not substantially interfere with the desired properties of the polymeric materials provided by this invention.

Referring to FIG. 1, the electrostrictive driver 10 comprises a DC bias voltage power source 12, an AC power source 14, the sonic wave projector 16 and circuit 18 electrically connecting said elements in series. Sonic wave projector 16 (shown in cross section) has electrodes 22 and electrostrictive polymer material films 20 which are in intimate contact with each other in alternating manner as shown.

The electrodes can be made of any suitable conductive material, such as metallic materials. It has been found suitable to use such metals as aluminum, copper, gold and other suitable metals. The thickness of the electrodes can vary depending upon the application, the sonic wave desired to be projected, and other factors. It has been found in illustration that the electrodes can suitably be made of aluminum foil having a thickness of 20–30 microns. It has additionally been found in illustration that the electrodes can be made of gold of a thickness of about 1000 Angstroms, which can be formed by deposit using evaporation upon the polymer material film layers 20.

The thickness of the polymer material film layers 22 can also vary in thickness. For example, it has been found that polymer material film layers 22 can suitably have a thickness in the range of about 10 to about 100 microns, with about 25 microns often being suitable.

The number of polymer material layers and the separating electrode 20 layers can vary widely depending upon the nature and magnitude of the sonic wave projection desired. For example, only one polymer material layer 20 and one electrode layer can be used in combination. Also, the number of polymer material layers can be increased to 5 to 10 or more, depending upon the type and magnitude of sonic wave generation desired and other factors.

The height and width of the electrodes and polymer material film layers will be readily selected by those skilled in the art.

The sonic waves projected can be acoustic.

The combination of electrodes and polymer material film layers will be attached to the support 24 by using non-electroconductive means.

The bias voltage used can be varied in order to obtain the desired magnitude of Angstrom/volt response. The voltage must be sufficiently high to provide sufficient sonic output.

The DC bias voltage and AC sources and the conductive circuit will be selected within the skill of the art to provide effective functioning of the electrostrictive driver of this invention.

Additionally, other necessary support elements for the effective functioning of the electrostrictive driver will be readily apparent to those skilled in the art.

Figure 2:
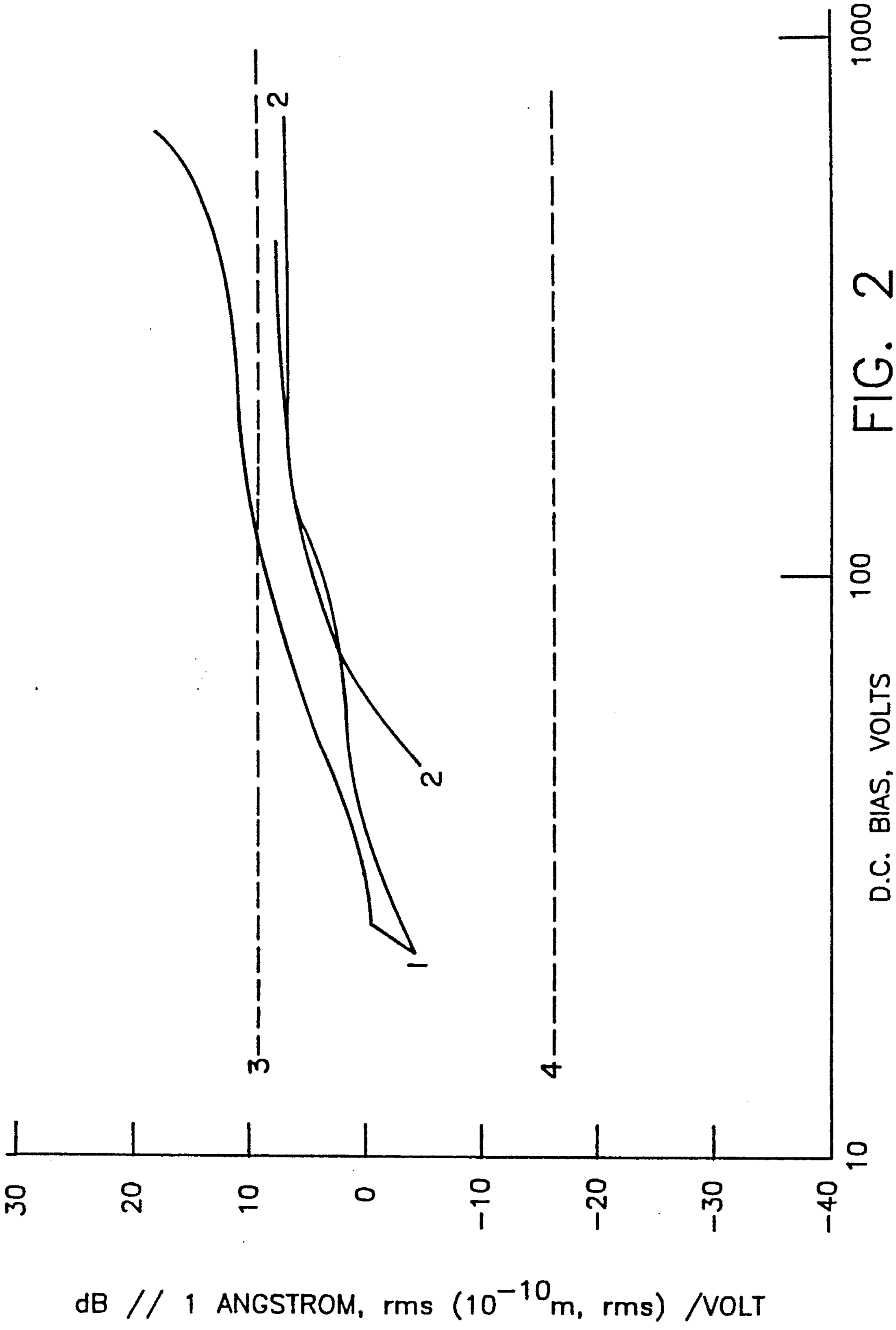
FIG. 2 is a graph showing the results of measured values of the "thickness" piezoelectric constant, $d_T$, for polymeric materials of this invention wherein said materials are poly(vinylidene fluoride) solutions. The data is shown as dB//1 Angstrom, rms ($10^{-10}$ m, rms)/volt vs DC Bias, Volts.

Referring to FIG. 2, this is a graph showing the response of two polymer materials of this invention, materials 1 and 2, as compared to two other materials, 3 and 4.

Material 3 is a standard ceramic PZT alloy material as described above. Material 4 material is a polarized poly(vinylidene chloride) material sold under the designation Pennwalt 1000S.

Material 1 is a polymer material which has 35 percent $PVF_2$ and 65 percent TCP. Material 2 is another polymer material which has 60 percent $PVF_2$ and 40 percent TCP. The graph shows a response at 500 volts D.C. bias, of greater than 6 Angstroms/Volt for Material 1 and greater than 4 Angstroms/Volt for Material 2. The response for control Material 4 is unsatisfactory and the present standard Material 3 shows greater than 5 Angstroms/Volt. Materials 3 and are used as conventional piezoelectrics and require no bias voltage.

Also, effective polymeric materials having no or low amounts of solvent can be used to make the films of the sonic wave generation elements, as stated above. For example, polyurethane polymers, polyurea polymers, and polymers having a combination of urethane and urea groups can be desirably used, for example, such polymers having a modulus, $N/m^2$, of from about $10^7$ to about $10^8$ $N/m^2$.

In operation, the D.C. bias source provides a suitable bias voltage, such as 500 volts. This can be varied upwardly or lowered, depending upon the polymer material layers and electrodes used, the sonic wave projected, and other factors.

Also, the A.C. source is engaged to superimpose upon the D.C. bias voltage to provide the desired sonic wave projection.

If only static displacement or changes in thickness are desired, only the D.C. bias field is necessary to obtain the required electrostrictive strain. This would be the type of operation envisaged for actuator or other appropriate applications.

EXAMPLE 1

Five parts of Kureha capacitor grade poly(vinylidene fluoride) ($PVF_2$) film are dissolved in 95 parts of tricresylphosphate at 185° C. The solution is transferred to a tray and placed into a vacuum oven. The oven is maintained at a vacuum of about $10^{-3}$ torr and at a temperature within the range of 150°-200° C. until a $PVF_2$ and 30 percent by weight of tricresylphosphate.

Samples of the polymeric composition are taken when the percentage of TCP reaches about 65 and about 40 percent, respectively, and at other useful percentages.

EXAMPLE 2

Five parts of Kynar copolymer $VF_2VF_3$ (80% $VF_2$) film produced by Pennwalt Corporation are dissolved in 95 parts of tricresylphosphate at 240° C. The solution is transferred to a tray and placed into a vacuum oven. The oven is maintained at a vacuum of about $10^{-3}$ torr and at a temperature within the range of 100°-120° C. until a copolymer solution is obtained having about 70 percent by weight of copolymer and 30 percent by weight of tricresylphosphate.

Samples of the polymeric material are taken when the solvent content is about 65 and about 40 percent, respectively, at other useful percentages.

EXAMPLE 3

One part by weight of Nylon 11 is dissolved in four parts of 2-ethyl-hexane 1,3 diol at 150° C. The solution is transferred to a tray and placed in a vacuum oven. The oven is maintained at a vacuum of about $10^{-3}$ torr and at a temperature of 50° C. until Nylon 11 solution is obtained having about 50% by weight of Nylon 11.

Samples of the polymeric material are taken at various solvent contents.

EXAMPLE 4

One part by weight of Nylon 7 is dissolved in four parts of 2-ethyl-hexane 1,3 diol at 170° C. The solution is transferred to a tray and placed in a vacuum oven. The oven is maintained at a vacuum of about $10^{-3}$ torr and at a temperature of 50° C. until Nylon 7 solution is obtained having about 50% by weight of Nylon 7.

Samples of the polymeric material are taken at various solvent contents.

What is claimed is:

1. An electrostrictive driving device comprising 1) an element for sonic wave projection, said element having one or more polymeric film layers which provide said sonic wave projection, said polymeric film layers being free of additives which substantially interfere with the electrostrictive thickness response providing said sonic wave projection, electrode layers in intimate contact with said one or more polymeric material layers and separating said polymeric material layers provided there is more than one of said layers, and a support for the film layer-electrode layer combination;

2) positive and negative terminals electrically connected to said element;

3) a DC bias voltage source electrically connected to said terminals capable of providing a high bias voltage to said polymeric material film layers; and 4) superimposed upon the DC circuit an AC source which causes said element to provide effective sonic wave projection;

said device capable of producing an electrostrictive thickness response greater than about 1 Angstrom/V.

2. A device of claim 1 wherein the polymeric material of the film layer has a modulus in the range of about $10^7$ to about $10^8$ $N/m^2$.

3. A device of claim 1 wherein the polymeric material of the film layer has a sensitivity greater than 3 Angstroms/V.

4. A device of claim 1 wherein the polymeric material of the film layer has a sensitivity of at least 5 Angstroms/V.

5. A device of claim 4 wherein the polymeric material is polyurethane.

6. A device of claim 4 wherein the polymeric material is polyurea.

7. A device of claim 4 wherein the polymeric material is a polymer having a combination of urethane and urea groups.

8. A device of claim 4 wherein the thickness of the film layers is in the range of about 10 to about 100 microns.

9. A device of claim 8 wherein the thickness of the film layers is about 25 microns.

10. A sonic wave projection element for use in an electrostrictive driving device having one or more polymeric film layers wherein the film is made of a polymeric material capable of providing an electrostrictive thickness response under high DC bias having a sensitivity of more than 1 Angstrom/V, said polymeric film layers being free of additives which substantially interfere with the electrostrictive thickness response to provide said sonic wave projection, electrode layers in intimate contact with said one or more polymer material layers and separating said polymeric material layers provided there is more than one of said layers and a support for said polymer material layer-electrode layer combination.

11. An element of claim 10 wherein the polymeric material of the film layer has a modulus in the range of about $10^7$ to about $10^8$ $N/m^2$.

12. An element of claim 10 wherein the polymeric material of the film layer has a sensitivity of at least 5 Angstroms/V.

13. An element of claim 12 wherein the polymeric material is selected from the group consisting of polyurethane, polyurea and polymers having a combination of urethane and urea groups.

14. An element of claim 13 wherein the modulus of the polymeric material is about $10^7$ $N/m^2$.

15. An element of claim 10 wherein the thickness of the film layers is in the range of about 10 to about 100 microns.

16. An element of claim 10 wherein the polymeric material is free of any substantial amount of crystallinity.

17. An element of claim 10 wherein the thickness of the film layers is in the range of about 25 microns.

18. A process for sonic wave projection using an electrostrictive driving device comprising 1) an element for sonic wave projection, said element having one or more polymeric film layers which provide said sonic wave projection, said polymeric film layers being free of additives which substantially interfere with the electrostrictive thickness response providing said sonic wave projection, electrode layers in intimate contact with said one or more polymeric material layers and separating said polymeric material layers provided there is more than one of said layers, and a support for the film layer-electrode layer combination;
2) positive and negative terminals electrically connected to said element;
3) a DC bias voltage source electrically connected to said terminals capable of providing a high bias voltage to said polymeric material film layers; and
4) superimposed upon the DC circuit an AC source which causes said element to provide effective sonic wave projection;

said device capable of producing an electrostrictive thickness response of at least about 1 Angstrom/V.

19. An element of claim 15 wherein the high bias voltage applied is in the range of from about 300 to about 1000 volts.

20. A process of claim 18 wherein the polymeric material of the film layer of the device used has a modulus in the range of about $10^7$ to about $10^8$ $N/m^2$.

21. A process of claim 18 wherein the polymeric material of the film layer of the device used has a sensitivity greater than 1 Angstrom/V.

22. A process of claim 18 wherein the polymeric material of the film layer of the device used has a sensitivity of at least 5 Angstroms/V.

23. A process of claim 21 wherein the polymeric material of the device used is polyurethane.

24. A process of claim 22 wherein the polymeric material of the device used is polyurea.

25. A process of claim 22 wherein the polymeric material of the device used is a polymer having a combination of urethane and urea groups.

26. A process of claim 22 wherein the thickness of the film layers in the device used is in the range of about 10 to about 100 microns.

27. A process of claim 26 wherein the thickness of the film layers in the device used is about 25 microns.

28. A device of claim 1 wherein said polymeric material is nonpiezoelectric.

29. A process of claim 18 wherein the sonic wave projection is acoustic.

30. A process of claim 18 wherein the bias voltage applied is in the range of about 300 to about 1000 volts.

* * * * *